350-320. SR
11-25-75 OR 3,922,074

United States Patent [19]

Ikegami et al.

[11] 3,922,074
[45] Nov. 25, 1975

[54] INFORMATION STORAGE AND RETRIEVAL

[75] Inventors: Yoshizo Ikegami, Nishinomiya; Akio Miyauchi, Tokyo, both of Japan

[73] Assignee: Fuji Photo Film Co., Ltd., Minami-ashigara, Japan

[22] Filed: Sept. 24, 1973

[21] Appl. No.: 399,898

[30] Foreign Application Priority Data

Sept. 25, 1972 Japan ................................ 47-95900

[52] U.S. Cl. ........................ 350/320; 350/167; 35/2; 35/9 H; 354/101

[51] Int. Cl.² ....................G09C 5/00, G02B/27/00

[58] Field of Search ..... 350/167, 130, 350/131, 320; 354/110, 115, 120, 123, 125, 101; 352/81; 35/2, 9 H; 40/137

[56] References Cited

UNITED STATES PATENTS

| | | | |
|---|---|---|---|
| 2,058,581 | 10/1936 | Fegan | 40/137 |
| 2,189,751 | 2/1940 | Bocca et al. | 350/162 SF |
| 2,733,291 | 1/1956 | Kell | 350/162 SF |
| 3,166,625 | 1/1965 | Brumley | 354/101 |
| 3,178,993 | 4/1965 | Ferris et al. | 354/101 |
| 3,387,547 | 6/1968 | Houghton | 354/101 |
| 3,398,665 | 8/1968 | John et al. | 350/167 |
| 3,425,770 | 2/1969 | Mueller et al. | 350/162 SF |
| 3,459,111 | 8/1969 | Cooper | 354/123 |
| 3,494,270 | 2/1970 | Shibata | 354/112 |
| 3,609,035 | 9/1971 | Ataka | 354/101 |
| 3,704,055 | 11/1972 | Hong | 350/167 |
| 3,791,712 | 2/1974 | Miyagi | 350/167 |

*Primary Examiner*—Ronald J. Stern
*Assistant Examiner*—Jon W. Henry
*Attorney, Agent, or Firm*—Sughrue, Rothwell, Mion, Zinn & Macpeak

[57] ABSTRACT

Identifying information is stored or recorded on a recording element and camouflaged by recording the identifying information on a recording element through an information transformation medium such as a lenticular plate and then camouflaging the recorded information by recording the information on the same recording element through the information transformation medium, disposed at a different position than that used in recording the identifying information thereby concealing the identifying information recorded on the recording element. The concealed information thus storaged or recorded can be identified by observing the recording element through the same information transformation medium at the same position used in the initial recording of the identifying information.

2 Claims, 8 Drawing Figures

INFORMATION STORAGE AND RETRIEVAL

BACKGROUND OF THE INVENTION

1. Field of the Invention

The present invention relates to a method of storing or recording an identifying information on a recording element and camouflaging it and also a method of retrieving the concealed identifying information thus recorded.

SUMMARY OF THE INVENTION

The present invention provides an information storage and retrievel system in which an identifying information for, e.g., an ID card such as credit card, is recorded on a recording element and then the recorded information is concealed or rendered indiscernible by camouflaging the information to provide a scrambled record of the identifying information which can not be discerned by the naked eye and further the concealed information can be discerned using only a specific retrievel or reproduction technique. By employing such a system as described above, the use of the ID card. etc., in an unauthorized manner can be prevented.

BRIEF DESCRIPTION OF THE ACCOMPANYING DRAWINGS

Now, the invention will be described by reference to the accompanying drawings, in which FIG. 1 is a schematic sectional view showing an embodiment of this invention for recording an identifying information on a recording element, FIG. 2 is a schematic sectional view showing an embodiment of this invention for camouflaging the recorded information on the recording element thereby concealing the information recorded on the recording element, FIG. 3 is a schematic view showing a manner of retrieval of the recorded information, FIG. 4 is a schematic perspective view showing another embodiment for camouflaging the recorded information, FIG. 5 is a schematic sectional view showing still another embodiment for camouflaging the recorded information, FIG. 6 is a schematic perspective view showing an additional embodiment of an information transformation plate used for recording an identifying information and then camouflaging the recorded information, FIG. 7 is a schematic sectional view showing still another embodiment of an information transformation plate, and FIG. 8 is a schematic sectional view showing an additional embodiment of this invention for recording an identifying information and then camouflaging the information on a recording element.

DETAILED DESCRIPTION OF THE INVENTION

Figure 1:
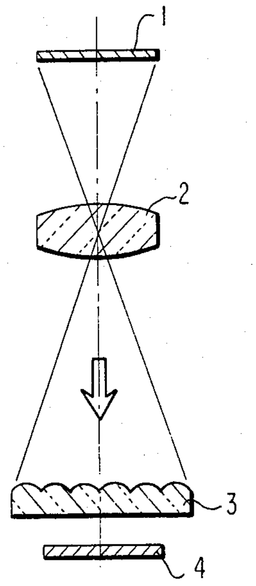

In FIG. 1 of the drawing, an identifying information of an original medium 1 is recorded on a recording element 4 such as a photosensitive element (e.g., a light sensitive silver halide material), an electrophotosensitive element (e.g., as disclosed in U.S. Pat. No. 2,297,691), etc., through an optical system 2 for forming an image, and an information transformation medium 3 having the ability to focus the image, such as a lecticular plate. When the recording element 4 is a photosensitive element, the recording is conducted using a photographic image exposure, while when the recording element is an electrophotosensitive element, the recording is conducted using an electrophotographic image-forming technique.

Also, a magnetic recording element and magnetic recording system can be employed in this invention. For example, binary coded identifying information can be recorded on a magnetic tape or strip at regular intervals in a first recording step and in a second recording step the camouflaging binary coded information can be recorded on the same tape or strip. In such an embodiment an information transformation medium is employed, with the information transformation medium causing a shift of the position of the recording on the tape or in a change the pitch of the recording, for example, a change in pitch of one half interval.

When a lenticular plate having a cross sectional form as shown in FIG. 1 is used as the information transformation medium 3, the identifying information of the original medium 1 is recorded as an image in the form of a large number of focused lines parallel to the generating line of the lenticular plate, the image being different from the original image of the identifying information.

Figure 2:
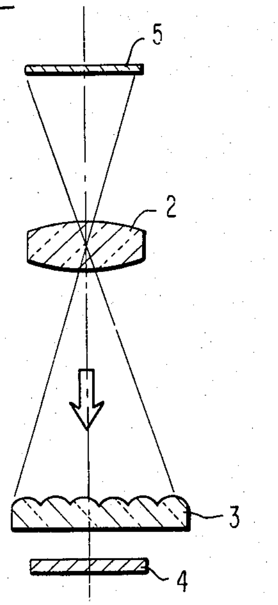

Then, information for camouflaging and concealing the recorded identifying information is recorded on the recording element as illustrated in FIG. 2. That is to say, camouflaging information of a camouflaging information-containing medium 5 is recorded on the same recording element 4 having thereon the identifying information image. In this recording the image-forming optical system 2 and the information transformation medium 3 are the same system and medium used in the recording of the identifying information as illustrated in FIG. 1. The positions of the medium 5, the image-forming optical system 2, and the recording element 4 are the same as those of the medium 1, the image-forming optical system 2, and the recording element 4 in the case of recording the identifying information as shown in FIG. 1, but the information transformation medium 3 only is shifted in a direction perpendicular to the central axis of the recording system to such an extent that the pitch of the lenticular plate employed as the information transformation medium in this embodiment does not coincide with the position of the pitch of the lenticular plate in the identifying information recording system.

The identifying information is, as described above, recorded on the recording element as a scrambled image by the information transformation medium and the scambled image thus recorded on the recording element is further concealed completely by the camouflaging information. Hence, the recorded image on the recording element can not be discerned or identified by the naked eye.

Figure 3:
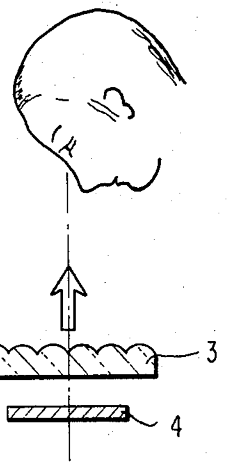

The retrievel or reproduction method of the concealed information thus recorded on the recording element is explained by reference to FIG. 3. Namely, the recording element 4 having the thus scrambled records of the identifying information and the camouflaging information and the information transformation medium 3 used in the two recordings are disposed at the same positions as or at corresponding positions to those used in recording the identifying information and in these configurations the recording element 4 is observed through the information transformation medium 3 as shown in FIG. 3, whereby the identifying information can be observed or discerned.

Figure 4:
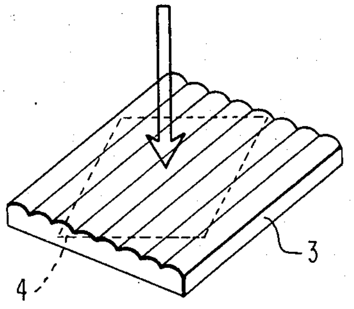

FIG. 4 illustrates also other embodiment of recording the camouflaging information using the same lenticular plate 3 as shown in FIG. 1 as the information transformation medium. That is to say, in recording the camouflaging information, the lenticular plate as the information transformation medium 3 used for recording the identifying information is positioned in the same plane as the original plate position so that the generating lines of the lenticular plate at the new position are at a different angle from that of the lenticular plate at the original position used in recording the identifying information. The camouflaging information thus recorded through the lenticular plate makes it difficult to completely discern the recorded indentifying information by the naked eye.

Figure 5:
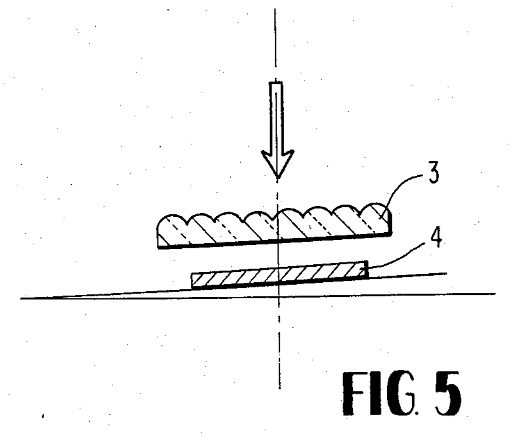

FIG. 5 illustrates a still other embodiment of recording the camouflaging information according to this invention. In this embodiment the camouflaging information is recorded on the recording element 4 having recorded thereon the identifying information through the information transformation medium 3 such as the lenticular plate used in recording the identifying information but in such an arrangement that the system composed of the information transformation plate 3 and the recording element 4 is at a different angle or inclination to the image-forming optical system from that used in recording the identifying information. In this case the recorded identifying information can be completely concealed from the naked eye.

Figure 6:
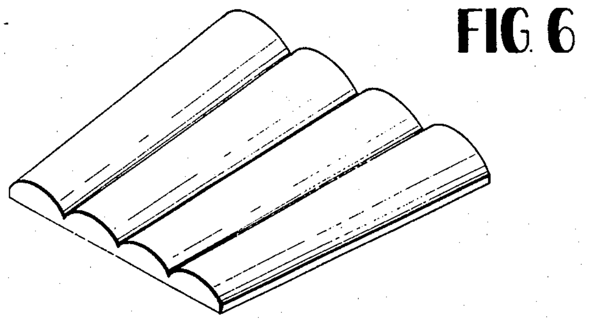

FIG. 6 illustrates another embodiment of an information transformation medium 3 from that illustrated in connection with FIG. 1 to FIG. 5. Namely, the generating lines of the lenticular plate described above as the information transformation medium in the embodiment illustrated in FIG. 1 to FIG. 5 are parallel to each other but the generating lines of the lenticular plate illustrated in FIG. 6 are truncated semi-conical lines with a common projected apex. In recording the camouflaging information using the lenticular plate with these radial generating lines, the lenticular plate is rotated slightly in the same plane but around a point of the projected apex from the position used in recording the identifying information. In retrieving the recorded information, the lenticular plate may be rotated back around the same point to the original position used in recording the identifying information. An information transformation plate of this type has the advantage that the position for the retrievel of the concealed identifying information recorded on a recording element can be easily set.

Figure 7:
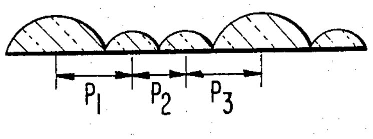

FIG. 7 illustrates a further embodiment of an information transformation medium in which a lenticular plate, in which the generating lines are disposed with different pitches, $P_1$, $P_2$, $P_3$, - - - is used. By using the lenticular plate of this type, the recorded identifying information becomes even more indiscernible by the naked eye.

Figure 8:
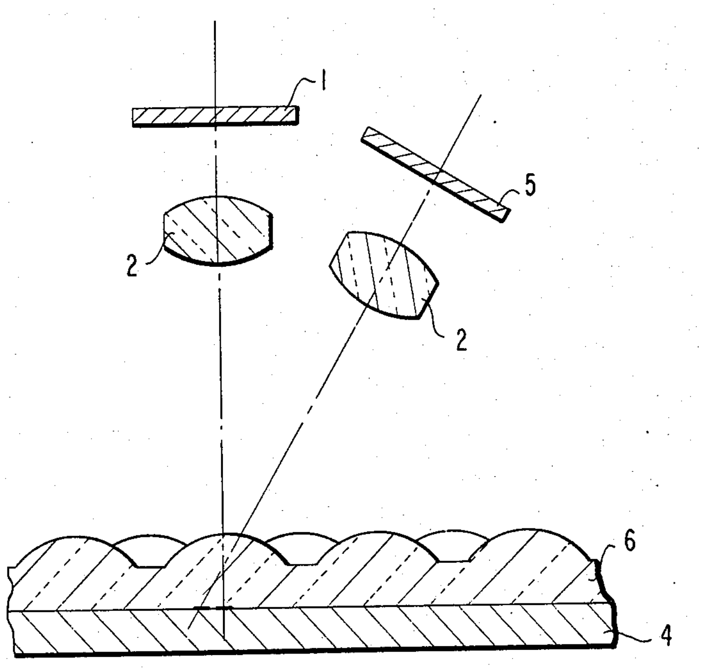

FIG. 8 illustrates still a further embodiment of the information transformation medium. That is to say, in this embodiment a so-called fly-eye lens, i.e., a lens plate 6 composed of a plurality of small lenses disposed in plane is employed. By using the lens plate of this type, the recording of the identifying information and then the camouflaging information and the retrieval of the recorded information can be practiced without changing the relative position of the lens plate 6 and the recording element 4. Namely, the identifying information is recorded on a recording element 4 though an image-forming optical system 2 and a lens plate 6 having a plurality of small lenses in such a configuration that the optical axis of the recording system is vertical to the lens plate 6 or the recording element 4. Then, the camouflaging information of the medium 5 is recorded on the recording element 4 through the image-forming optical system 2 and the lens plate 6 in such a configuration that the optical axis through the camouflaging information medium 5 and the image-forming optical system 2 to the lens plate 6 is different from that used in the system of recording the identifying information. The identifying information thus recorded on the recording element and then camouflaged by the camouflaging information through the lens plate can be retrieved by observing the record using the optical axis at the same angle as that used in recording the identifying information. In addition, in the embodiment illustrated in FIG. 8, the identifying information can be recorded in the optical axis used in describing the angle of recording the camouflaging information in the above example and then the camouflaging information can be recorded in the axis vertical to the lens plate 6.

As described above, for concealing the identifying information as the scrambled record thereof, the camouflaging information is further recorded on the scrambled record to provide a concealed record of the identifying information which can not be discerned by the naked eye and only the identifying information thus recorded can be discerned using a specific retrieval manner only. Thus, according to the present invention, the unauthorized use of ID cards, etc., can be prevented and further a simple retrieval or reproduction means can be provided.

Alternatively, the sequence of recording steps can be reversed, if desired, with the camouflaging information being recorded first and then the identifying information recorded.

As will be apparent to one of skill in the art, various changes can be made in the above embodiments without departing from the scope of the invention herein involved, and it is intended that all description in the above disclosure and the accompanying drawings shall be interpreted as illustrative and not limiting.

What is claimed is:

1. A method of information handling including producing an element having camouflaged information recorded thereon which comprises:

a first recording through an information transformation medium comprising a lenticular plate having truncated semi-conical lenses with a common projected apex, of first information from an information-carrying medium onto a recording element comprising a photosensitive or electrophotosensitive element, said information-carrying medium, said information transformation medium and said recording element being positioned relative to each other in a first spatial configuration, a second recording through said information transformation medium of camouflaging or noise information from said information-carrying medium onto said recording element, said information-carrying medium, said information transformation medium and said recording element for said recording being positioned relative to each other in a second spatial configuration achieved by rotating said lenticular plate around the common projected apex to a position different than on said first spatial position, and wherein, an image-forming optical system is interposed between said information-carrying medium and said information transformation medium during said first and second recordings.

2. The method of claim 1, wherein said camouflaged recorded information is retrieved by the steps of using the same information transformation medium as used for recording the information in the first spatial configuration of said recording element and said information transformation medium as used in recording said information.

* * * * *